United States Patent [19]
Crowell, Sr.

[11] 3,916,564
[45] Nov. 4, 1975

[54] ROOT TREATING DEVICE
[76] Inventor: Edward G. Crowell, Sr., 6418 Cindy, Houston, Tex. 77008
[22] Filed: Sept. 4, 1973
[21] Appl. No.: 393,957

[52] U.S. Cl. .................. 47/48.5; 111/7.1; 138/89; 173/131; 175/23; 403/299
[51] Int. Cl.² ................. A01G 29/00; A01C 23/02; E21B 11/02
[58] Field of Search .......... 47/48.5, 1; 111/7.1, 7.2, 111/7.3, 7.4; 239/276, 271; 138/89, 90; 403/299, 343; 256/DIG. 5; 175/20, 23, 405; 173/131

[56] References Cited
UNITED STATES PATENTS

| | | | |
|---|---|---|---|
| 213,993 | 4/1879 | Inman | 256/DIG. 5 |
| 441,775 | 12/1890 | Renton | 138/89 UX |
| 656,887 | 8/1900 | Golibart | 47/48.5 |
| 790,910 | 5/1905 | McClintock | 175/23 X |
| 845,953 | 3/1907 | Hitchcock | 173/131 |
| 1,175,593 | 3/1916 | Brown | 111/7.1 |
| 1,517,119 | 11/1924 | Luhring | 256/DIG. 5 |
| 2,440,921 | 5/1948 | Stephens | 239/271 |
| 2,631,584 | 3/1953 | Purificato | 111/7.1 UX |
| 2,774,186 | 12/1956 | Wilkins | 47/39 X |
| 3,303,800 | 2/1967 | Young | 111/7.1 |
| 3,326,306 | 6/1967 | Weir | 111/7.1 |
| 3,613,310 | 10/1971 | Rynberk | 47/48.5 |

FOREIGN PATENTS OR APPLICATIONS

| | | | |
|---|---|---|---|
| 72,165 | 7/1929 | Sweden | 47/1 |
| 98,250 | 3/1923 | Switzerland | 47/1 |
| 453,429 | 9/1936 | United Kingdom | 47/48.5 |
| 8,852 | 4/1902 | Austria | 111/7.4 |
| 122,915 | 3/1878 | France | 111/7.1 |

*Primary Examiner*—Edgar S. Burr
*Assistant Examiner*—Steven A. Bratlie
*Attorney, Agent, or Firm*—Torres & Berryhill

[57] ABSTRACT

Disclosed is a device which may be positioned in the soil to supply water, food or medication to the root system of growing plants. The device includes a tubular housing closely surrounding a removable rod member having a lower pointed end surface. The rod is threadedly engageable and disengageable within a female threaded connector rotatably carried at the upper end of the housing. When the rod is removed, the connector may be secured to the threaded male end of a water supply hose. The upper end of the rod includes an internally threaded socket which provides temporary storage for a rod and employed with the female connector of the housing when the rod is removed and the hose is not being used. Tapered flanges are secured to the outer surface of the housing and are adapted to be positioned below the surface of the soil to prevent rotation and resist upward movement of the device. The device may be positioned during the initial planting of the plants to be treated or may be driven down into the root system of already growing plants.

1 Claim, 4 Drawing Figures

ROOT TREATING DEVICE

FIELD OF THE INVENTION

The present invention relates to the application of water, nutrients and medication to the subsurface root system of a tree or other plant. More specifically, the invention relates to a device adapted for use with a conventional water hose and capable of being positioned in the ground adjacent the root system of a plant to provide a means for supplying fluids directly to the roots of the plant.

DESCRIPTION OF THE PRIOR ART

The prior art has disclosed many devices capable of supplying fluids to the roots of growing plants. The simplest of these devices consist of a single tubular member with openings at each end. When placed within the ground adjacent a tree or other plant, the tubular member functions as a passageway for water to travel from the surface to the root system of the plant. Other devices employed for the same purpose are closed at the bottom but have side apertures which provide the subsurface outlets for the escape of water. Many of the conventional prior art devices are not designed for forced insertion into the ground. If such devices are not installed at the time of planting, a special hole must be dug in the soil.

Some of the prior art devices are constructed with a conical or tapered end which aids in the forced insertion of the device. Openings formed along the sides and ends of one such device permit water to flow into the root system of the adjacent plant. At the time of insertion of the devices, however, soil may be forced into and thus close the water outlet openings. Moreover, with extended use, sediment build-up or root growth may also clog the openings in conventional devices of this type.

One prior art device intended to be inserted into the ground provides a movable gate designed to sever root growth. In one position, the gate covers all of the lateral openings of the device and in another position, the openings are opened. A linkage attached to the gate and extending to the surface above the ground provides a means for moving the gate. Severed growth is allowed to collect in a subsurface area within the device which, after extended usage, is subject to being filled which in turn may cause blockage of the water outlet openings.

In many situations, due to soil conditions or otherwise, it is necessary to force water into the ground to loosen the soil for improved water absorption. To this end, the prior art has employed root feeders and watering tools to be used with a water hose. In one such device, a tee-fitting and valve are provided in combination with a female hose receptacle. In another device, a similar tee-fitting and valve assembly is provided with a pipe means for conducting the water into the ground. Prongs connected to the pipe means and in fluid communication therewith are forced into the ground to provide a means of root watering.

In general, the prior art devices which are employed below the earth's surface are subject to blockage and are relatively difficult to insert. Many of the devices are relatively complex and difficult to manufacture and employ.

SUMMARY OF THE INVENTION

The apparatus of the present invention provides a simple and effective means for applying water, nutrients or medication to the root system of trees and other plants. In use, the apparatus of the present invention may be installed with new plants or may be installed to treat existing plants. In the latter usage, the device is simply forced down through the ground into the root system of the plant to be treated. The apparatus is provided with a pointed end tip and is of strong, durable construction which permits it to be driven down into the earth. Tapered flanges formed along the side of the device resist upward movement of the device and also prevent the device from rotating. Once installed, a central rod may be withdrawn from the housing to provide a relatively large diameter opening communicating with a subsurface pocket formed by the lower end of the rod. The pocket provides a large area through which the water and other fluids supplied through the housing of the device may be dispersed into the surrounding root system. The rod is closely fitted within the outer housing of the device so that when it is in position, small roots cannot grow into and thus fill the housing and the pocket below the housing.

The upper end of the device which projects above the surface of the ground is provided with a female hose connection. With the rod removed, the connection may be attached to a conventional garden hose through which water or other fluids may be supplied. The fluids flow through the large opening of the housing and into the large dispersing pocket for relatively unimpeded and uniform dispersement into the surrounding root system. A threaded cap, temporarily stored at the upper end of the rod, may be employed to seal the top of the housing when the rod is removed. By this means, nutrients, both fluid and granular or having other physical embodiments may be placed within the housing and thereafter, the housing covered over with the plug. The materials contained within the housing are permitted to disperse slowly into the surrounding root system of the plant to provide the desired nourishment or medication.

The flanges carried on the outer surface of the rod are tapered to assist in piercing the surrounding soil as the device is initially being inserted. The upper ends of the flanges are substantially horizontal to resist upward movement of the device which may occur when pressurized water is being supplied to the device. The flanges prevent the device from rotating as the water hose, cap or rod are being threadedly engaged to or disengaged from the device.

Other features, advantages and objects of the invention may be more fully appreciated from the following specification and the related drawings and claims.

DESCRIPTION OF THE ILLUSTRATED EMBODIMENT

Figure 1:
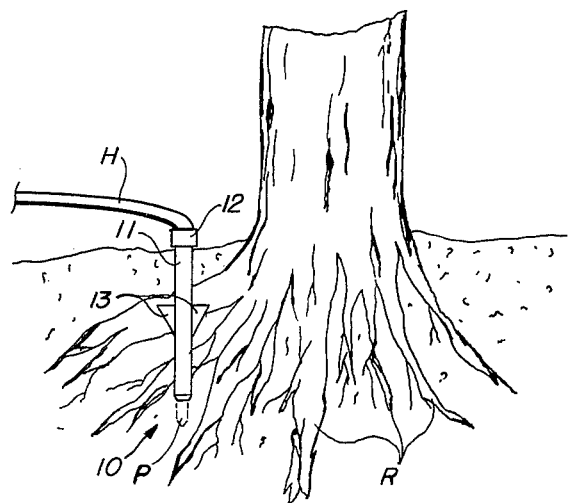
FIG. 1 is a schematic representation of the root treating device of the present invention in position to treat the root system of a tree.

FIG. 1 of the drawings illustrates the root treating device of the present invention, shown generally at 10, as including a hollow outer tubing or housing 11 and a female hose connector 12. The connector is rotatably secured to the housing 11. The device 10 is illustrated in operative position extending into the root system R of a tree. A plurality of radially extending flanges 13 anchor the device 10 in position within the ground. The flanges 13 prevent rotation of the device 10 and resist upward movement of the device as water under pressure is supplied through a garden hose H connected to the connector 12.

Figure 2:
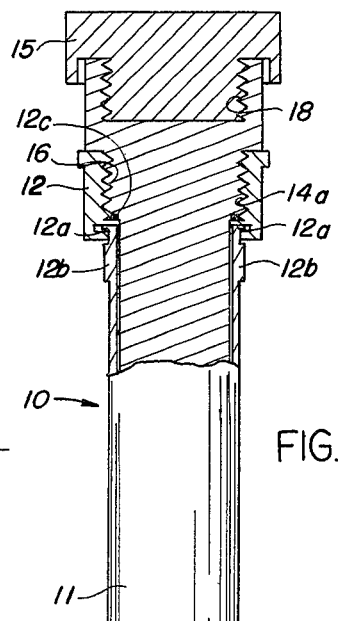
FIG. 2 is an elevation, partially broken away, illustrating the device of the present invention in assembled position.
Figure 3:
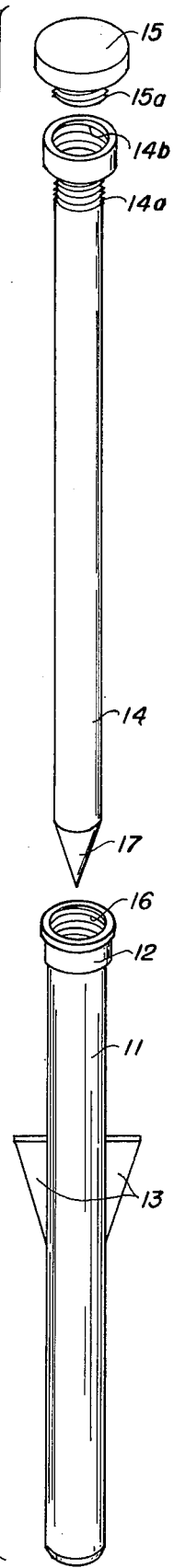
FIG. 3 is a reduced scale perspective view of the device of the present invention as it appears when separated into its individual components.

As best illustrated in FIGS. 2 and 3, the device 10 includes a solid insert rod 14 slidably receivable within the housing 11. A removable plug 15 is threadedly connected to the upper end of the rod 14 for a purpose to be explained hereafter. Internal threads 16 formed in the inner surface of the connector 12 are adapted to receive the male threads (not illustrated) of the garden hose H. The connector 12 is rotatably secured to the housing 11 by shoulder 12a and 12b. A resilient annular washer 12c is employed in a conventional manner to prevent leakage when the device is connected to the hose H.

FIG. 2 illustrates the device 10 in its completely assembled form ready for insertion into the ground. A taper point 17 on the lower end of the solid insert rod 14 assists in permitting the device to be driven into the ground. While not necessarily required, the rod 14 is preferably solid so that the assembled device is relatively strong and rigid. A strong and rigid construction is required to withstand severe blows which may be necessary when the device is being driven into a relatively hard soil formation.

The end of the insert rod 14 extends beyond the base of the housing 11 to form a small subsurface pocket P (FIG. 1). The pocket P allows fluids to be easily dispersed into the surrounding earth. Additionally, because of the increased dispersement area made available by the pocket, there is a reduction in the reactive force tending to lift the device out of the ground when pressurized water is being supplied through an attached hose.

As best seen in FIG. 2, a very close clearance is provided between the insert rod 14 and the housing 11. The relatively tight slip-fit prevents blockage of the device when it is initially inserted into the ground and also prohibits the growth of the roots into the bore of the housing when the device is not in use. Any small roots which are able to grow into the device when the rod 14 is removed are destroyed when the rod is reinserted into the housing.

The upper end of the rod 14 is equipped with threads 14a which are threadedly engageable with the internal threads 16 of the female hose connector 12. When the insert rod is positioned within the bore of the housing 11 and threadedly engaged with the female hose connector 12, the device is sealed off to prevent entry of foreign matter.

The upper end of the insert rod 14 also has female threads 14b connected with male threads 15a formed on the plug 15 to provide a convenient location for storing the plug. In FIG. 2, the plug 15 is shown threadedly engaged with the insert rod. The plug 15 is designed to threadedly engage the female hose connector 12 to prevent entry of foreign matter when a slow treating process is being employed. This is best illustrated in FIG. 4.

Figure 4:
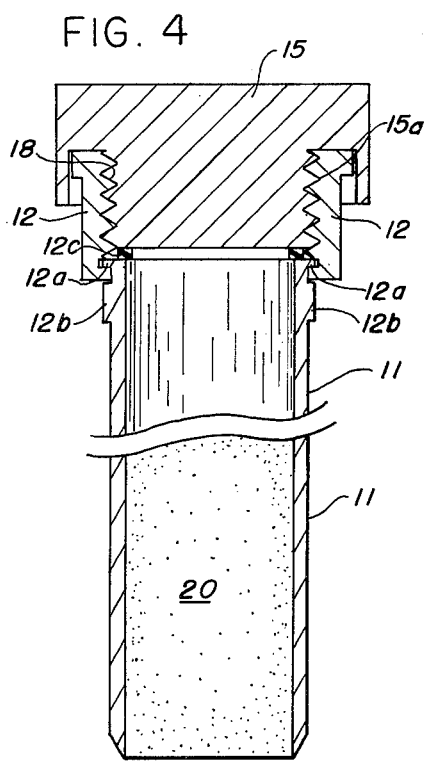
FIG. 4 is an enlarged vertical section of the upper portion of the device of the present invention as it is employed for slow treating of a root system.

Referring further to FIG. 4, the device of the present invention may be employed as a means for slow feeding or otherwise slowly treating the roots of a tree or other plant. With the rod 14 removed from the bore of the housing 11, fertilizer or medication 20 can be administered to the roots of the plant through a slow gravity feed. The plug 15 is employed to prevent insects and other foreign matter from entering the housing 11.

The foregoing disclosure and description of the invention is illustrative and explanatory thereof, and various changes in the size, shape and materials as well as in the details of the illustrated construction may be made within the scope of the appended claims without departing from the spirit of the invention.

I claim:
1. A root treating device comprising:
   a. an elongate, substantially tubular housing means having first and second axially spaced ends;
   b. rod means adapted to be removably carried within and closely surrounded by said housing means, said rod means having first and second axially spaced ends;
   c. a connector adjacent said second end of said housing means for securing said housing means to a fluid supply means when said rod means is removed whereby fluid supplied from said supply means may flow through said housing means;
   d. tapered end surface means provided on said first end of said rod means adapted to extend axially beyond said first end of said housing means for assisting in inserting said rod means and surrounding housing means into soil;
   e. releasable securing means adjacent said second end of said rod means and adapted to engage and cooperate with said connector for releasably securing said housing means and said rod means together;
   f. internal threads included in said connector with said connector being rotatably carried adjacent said second end of said housing means;
   g. releasable securing means including external threads carried on the external surface of said rod means and adapted to engage and mate with said internal threads in said connector, said rod means being of greater axial development than said housing means and said external threads being disposed at a point on said rod means whereby said first end of said rod means extends axially beyond said first end of said housing means when said external and internal threads are connected together;
   h. externally threaded covering means having threads adapted to mate with the internal threads in said connector for enclosing said housing when said rod means is removed, said rod means including an internally threaded recess adapted to mate with the threads on said covering means for storing said covering means when not in use to enclose said housing means; and
   i. axially and radially extending flange means connected to the outer surface of said housing means for preventing rotation and upward movement of said device in the soil, said flange means tapering inwardly in a direction from said second end of said housing means toward said first end of said housing means.

* * * * *